United States Patent [19]

Wade

[11] Patent Number: 4,676,811

[45] Date of Patent: Jun. 30, 1987

[54] WET AIR CLEANING APPARATUS

[75] Inventor: Rodney L. Wade, Eugene, Oreg.

[73] Assignee: Eugene Water & Electric Board, Eugene, Oreg.

[21] Appl. No.: 905,531

[22] Filed: Sep. 10, 1986

[51] Int. Cl.[4] .................. B01D 47/02; B01D 47/10
[52] U.S. Cl. ................................. 55/223; 55/94; 55/95; 55/227; 55/253; 55/259
[58] Field of Search ............... 55/89, 94, 95, 223, 55/227, 243, 248, 250, 253, 259; 261/22, 116, 125, DIG. 54

[56] References Cited

U.S. PATENT DOCUMENTS

| 2,484,277 | 10/1949 | Fisher | 55/248 X |
| 2,585,440 | 2/1952 | Collins | 55/223 X |
| 2,988,166 | 6/1961 | Klemm | 55/253 |
| 3,465,504 | 9/1969 | Oropeza et al. | 55/259 X |
| 3,791,104 | 2/1974 | Clitheroe | 55/95 X |
| 3,856,487 | 12/1974 | Perez | 55/223 |
| 3,870,489 | 3/1975 | Shaddock | 55/314 |
| 4,183,116 | 1/1980 | Thompson | 15/353 |
| 4,490,162 | 12/1984 | Davis | 55/213 |
| 4,509,963 | 4/1985 | Jackson | 55/324 |

Primary Examiner—Charles Hart

Attorney, Agent, or Firm—Henderson & Sturm

[57] ABSTRACT

A wet cleaning apparatus including a sealed container adapted to hold a liquid, such as water. A separator compartment is disposed within the container and has an open bottom extending into the liquid within the container. The air to be cleaned enters the compartment within the container and a liquid is sprayed on such air causing the solid particles therein to be wet and heavy and drop into the water therebelow. The air in the separator compartment exits through a venturi scrubber having a nozzle for spraying this air with liquid as it goes through the venturi opening, further wetting down any additional solid particles in the air and causing them to drop into the water in the container as the air leaves the separator compartment. The air in the compartment then flows above the liquid, around a baffle, through a pre-filter, through a high efficiency particulate air filter and out through an exhaust fan as clean, breathable air. A nozzle disposed within the container and below the separator compartment is provided for causing the liquid having the most solids therein to circulate from below the separator compartment into the liquid in the rest of the container.

10 Claims, 5 Drawing Figures

WET AIR CLEANING APPARATUS

TECHNICAL FIELD

The present invention relates generally to an apparatus for cleaning air, and more particularly to a wet air cleaning system which is primarily useful to remove airborne asbestos resulting from the removal of asbestos contaminated insulation from steam lines in underground vaults.

BACKGROUND ART

Many years ago, asbestos was commonly used as an insulator in a variety of applications. Now that it is well known that asbestos fibers are carciogenic, it has been a government imposed regulation that such asbestos be removed, especially in public places. A major problem with such removal is that the asbestos fibers become airborne and workers trying to remove the asbestos will breathe in this dangerous substance if it is not removed from the air. Consequently, various air cleaning systems have been devised to do this job.

One of the most common air filtration systems is a dry air filtration system which utilizes a high efficiency particulate air (HEPA) filter to separate the solids from the air. The problem is that these HEPA filters become plugged very quickly, and exacerbating the problem is the fact that these filters are extremely expensive.

Consequently, there is a need for an air cleaning system which overcomes the aforementioned problems.

DISCLOSURE OF THE INVENTION

The present invention relates to a wet cleaning apparatus including a sealed container adapted to hold a liquid, such as water. A separator compartment is disposed within the container and has an open bottom extending into the liquid within the container. The air to be cleaned enters the compartment within the container and a liquid is sprayed on such air, causing the solid particles therein to be wet and heavy and drop into the water therebelow. The air in the separator compartment exits through a venturi scrubber having a nozzle for spraying this air with liquid as it goes through the venturi opening. This has the further affect of wetting down any additional solid particles in the air and causing them to drop into the water in the container as the air leaves the separator compartment. The air in the container then flows above the liquid, through a baffle, through a pre-filter, through a high efficiency particulate air filter and out through an exhaust fan as clean, breathable air.

A submersible pump with the container supplies liquid to the nozzles of this separator compartment and the venturi scrubber. Additionally, a nozzle disposed within the container and below the separator compartment is also connected to the pump for causing the liquid having the most solids therein to circulate from below the separator compartment and into the liquid in the rest of the container.

An object of the present invention is to provide an improved air cleaning apparatus.

A further object of the present invention is to provide an air cleaning apparatus which will increase the life of very expensive high efficiency particulate air filters.

A further object of the invention is to provide a negative pressure in the asbestos contaminated work area. This prevents spreading asbestos to other areas.

A still further object of the present invention is to provide a wet air cleaning apparatus to remove airborne asbestos during the removal of asbestos contaminated insulation from steam lines in underground vaults or for removing asbestos from above ground buildings.

Other objects, advantages, and novel features of the present invention will become apparent from the following detailed description of the invention when considered in conjunction with the accompanying drawings.

BEST MODE FOR CARRYING OUT THE INVENTION

Figure 1:
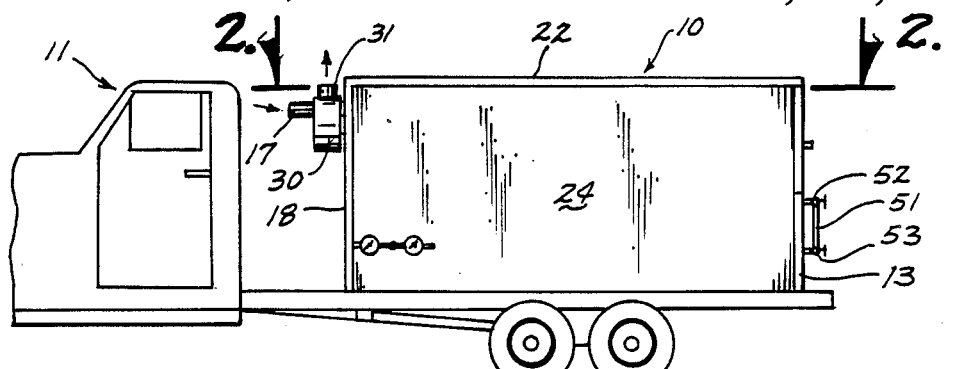
FIG. 1 shows a truck having a wet air cleaning system in accordance with the present invention attached thereto.

Referring now to the drawings, wherein like reference numerals designate identical or corresponding parts throughout the several views, FIG. 1 shows a wet air cleaning apparatus (10) constructed in accordance with the present invention shown attached to a truck (11).

Figure 2:
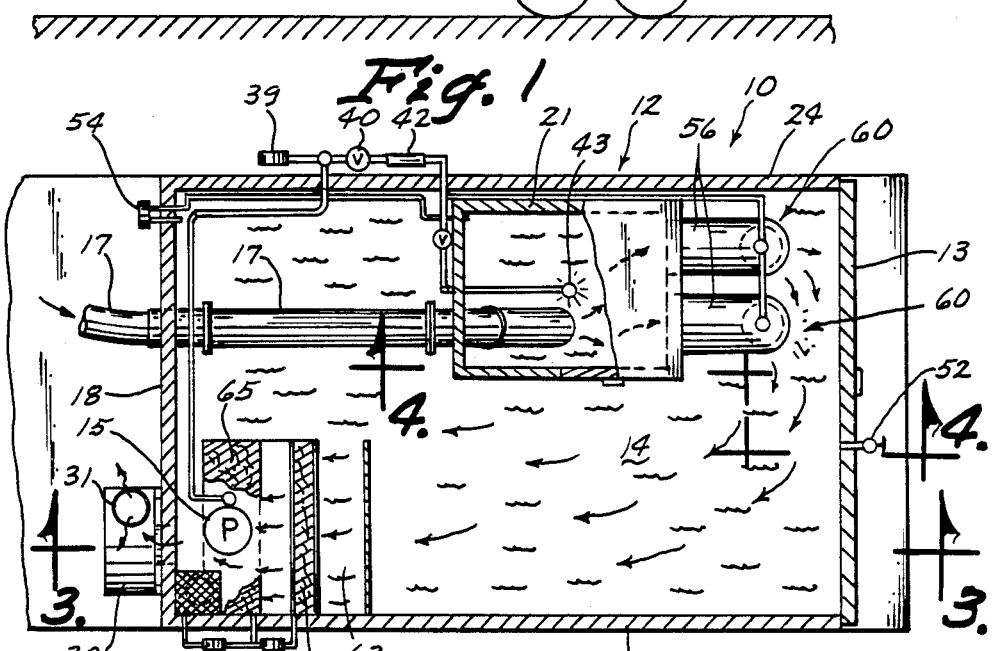
FIG. 2 is a cross sectional view taken along line 2—2 of FIG. 1.
Figure 3:
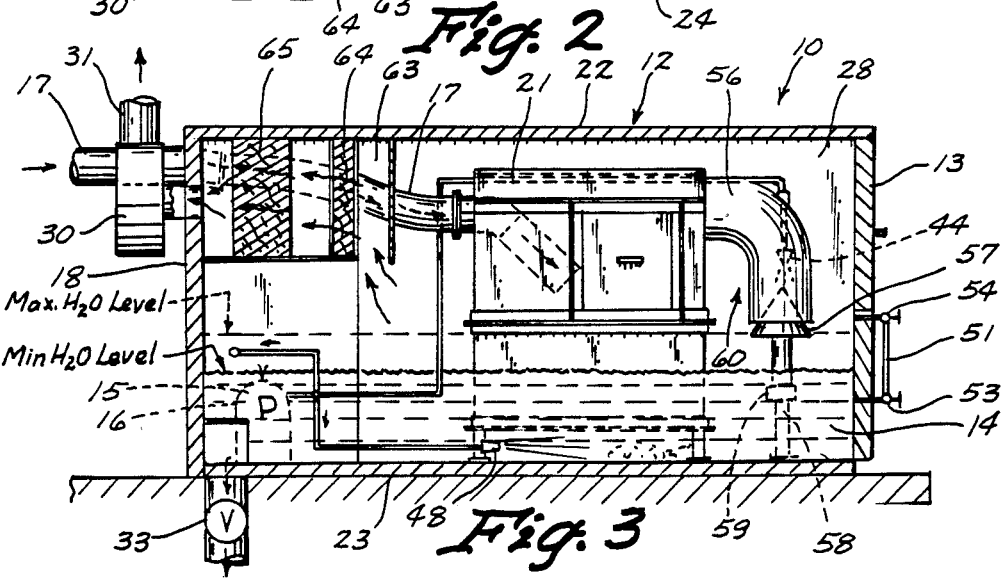
FIG. 3 is a cross sectional view taken along line 3—3 of FIG. 2.

Referring to FIGS. 2 and 3, for example, it is noted that a container (12) having walls (24) and a rear door (13) thereon is provided for holding a liquid (14) such as water to a first minimum level above a submersible pump (15) having a filtering screen (16) extending therearound, or at least around the inlet thereof. The minimum water level is set as equal to the height required to prevent air from bypassing the venturi scrubber by flowing from the separator compartment through the bottom opening to the container. The minimum water level is equal to the sum of the height of the bottom opening of the separator plus the pressure drop of venturi (10" of water) plus a safety factor of 3-4". This level will inherently be enough height for proper operation of the submersible pump. An eight inch diameter vacuum hose (17) extends through a front wall (18) of the container and continues on to an outlet (19) within a compartment (21) disposed inside of the container (12). The container (12) is also sealed shut by a top (22) and a bottom (23). The separator compartment (21) as can best be viewed in FIG. 4, has an open bottom (26) so that the fluid (14) will form a seal to prevent the air within the space (27) from being in communication with the air in space (28) of the container (12).

A 3,000–4,000 cubic feet per minute exhaust fan (30) is provided for sucking air into the vacuum hose (17) and through the wet air cleaning apparatus (10) and out an opening (31) so that clean and breathable air will exit the exhaust (31) of the exhaust fan (30).

Figure 5:
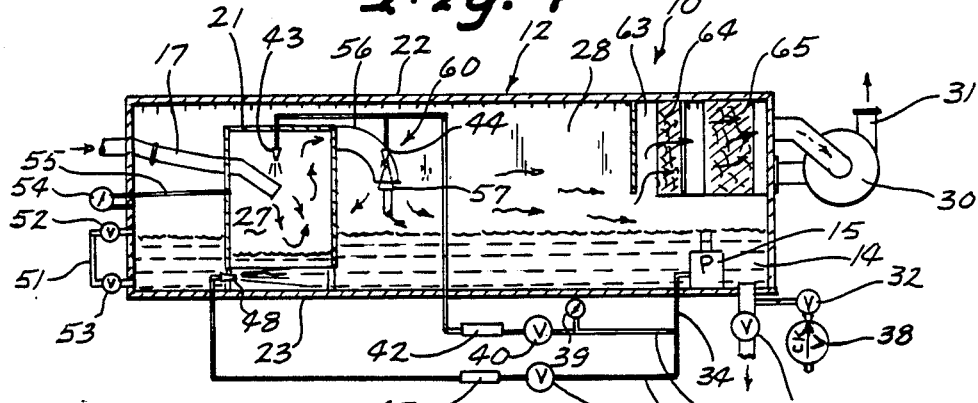
FIG. 5 is a schematic cross sectional view of a preferred embodiment of the present invention showing the air flowing from left to right during the cleaning process.

A fill valve (32) and a check valve (38), for example as shown in FIG. 5, is provided to allow water under pressure to enter the container (12) and a dump valve (33) is provided for allowing the liquid (14) to be dumped from the container (12) when desired.

The submersible pump (15) pumps the liquid (14) within the container (12) and recirculates it through a conduit (34) to lines (36) and (37). The line (36) has a pressure gauge (39), an on-off valve (40) and a sight glass (42) which leads to a nozzle (43) and (44). Similarly, the line (37) has an on-off valve (46), and a sight glass (47) for determining if and when liquid is flowing therethrough and the line (37) also leads to an underwater nozzle (48) located under the separator compartment (21).

A sight glass (51) having valves (52) and (53) disposed on each side thereof are connected to the container rear door (13). A vacuum gauge (54) has one side connected by a line (55) to the interior of the separator compartment (21) and the other side to the interior space (28) of the container thereby giving a reading of a differential pressure between the air in spaces (27) and (28).

Figure 4:
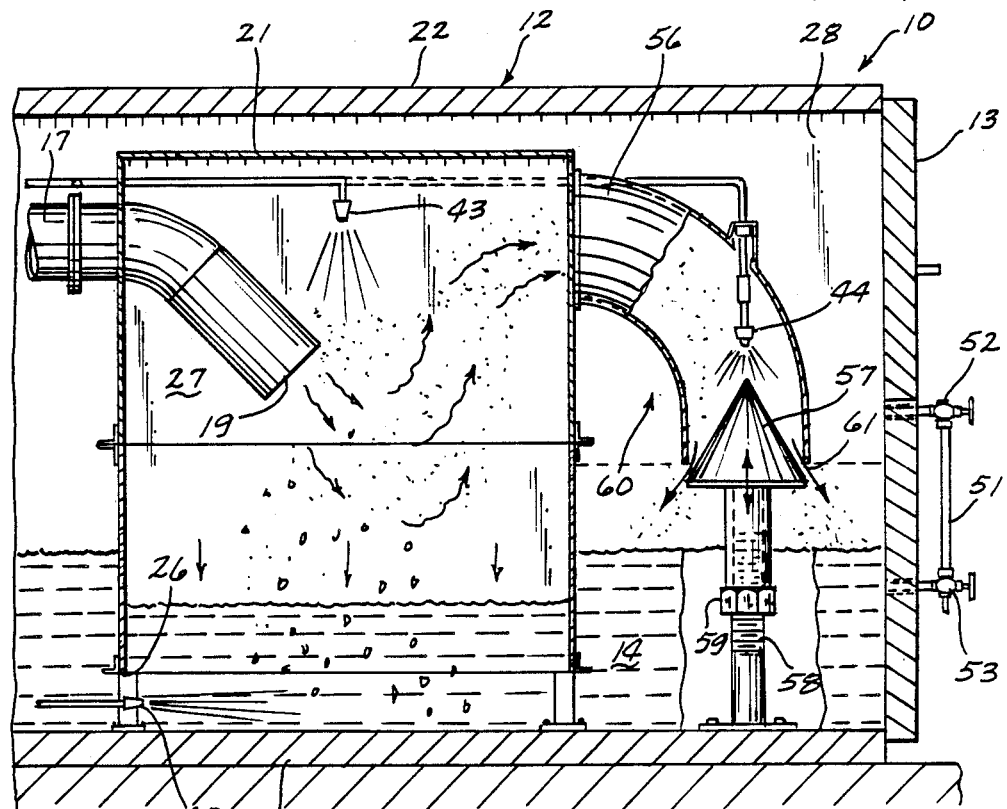
FIG. 4 is an enlarged partial cross sectional view taken along line 4—4 of FIG. 2.

In operation, the container (12) would be filled with water or another liquid (14) by opening the fill valve (32) with a dump valve (33) closed. When the water reaches the minimum level, as shown in FIG. 3, then the fill valve would be closed. Then the pump (15) would be turned on and the valve (40) opened to allow a spray of water to be emitted from the nozzles (43,44). Under normal operation, valve (46) is closed and valve (40) is open. Periodically, to clean out area below separator, valve (46) is opened and valve (40) is closed. The exhaust fan (30) can then be turned on to suck air to be cleaned into the vacuum hose (17) to cause it to enter the separator compartment (21). Particles of asbestos or other solid particles in the air within the chamber (27) will become wet and heavy because of the spray of nozzle (43) and will cause such particles to enter the water below the separator compartment (21) as can best be seen in FIG. 4. As these particles fall down by gravity, they will be prevented from building up in the area just below the separator compartment (21) because of the presence of the nozzle (48) which will periodically circulate this water and solids to other parts of the container (12) when valve (46) is opened and valve (40) is closed. The air that is still within the separator (21) that has passed beyond the spray from nozzle (43) will enter an exit tube (56). The outlet tube (56) along with a cone-shaped structure (57) which is adjustable vertically by a threaded post (58) and threaded nut assembly (59), in conjunction with the nozzle (44), is generally referred to as a venturi scrubber (60). As the asbestos particles that have not been removed by the nozzle (43) within the separator compartment (21) pass down over the cone (57) to pass through opening (61), they are again sprayed with water and many more of such particles will be saturated to the point that they will drop into the water (14) just below cone (57) as shown in FIG. 4.

The rest of the air within the space (28) of container (12) will be pulled by the exhaust fan (30) around a baffle (63), which will direct the air to a pre-filter (64), which will in turn direct the air to a high efficiency particulate air filter (65). The pre-filter (64) typically has a thirty percent ASHRAE efficiency, while the HEPA filter (65) is 99.9 percent efficient and removes all particles down to 0.03 microns if not smaller. The air is then exhausted through the exhaust (30) and out the outlet (31) as clean and safe breathable air.

Referring to FIG. 2, it is noted that there are two venturi scrubbers (60) disposed in parallel with one another, each having a cone (57) and nozzle (44) therein. A pressure drop is created in the venturi scrubber (60) and the cones (57) tend to be self-cleaning. The water spray upstream of each of the wet cones wets the airborne particles, resulting in their separation from the airstream. The venturi pressure drop is preferably adjusted to ten inches of water, which will remove particles down to 1.5-2 microns in length.

Measurement of the venturi pressure drop is accomplished with a vacuum gauge (54) that measures the pressure drop between the container (12) and the separator compartment (21), as has been mentioned previously. It is noted that the level of water within the separator compartment (21) is lower than the level of water (14) within container (12) because the pressure therein is higher than the pressure in the chamber (28) of the container (12). This is primarily due to the action of the venturi scrubbers (60) and the fact that the combined area of the two openings (61) of the two venturi scrubbers (60) is much less than the inlet of the vacuum hose (16) and outlet (19).

It is also noted that in FIG. 5 the apparatus has been shown more schematically so that the air can be followed from the left hand side to the right hand side, whereas, in the actual embodiment shown in FIGS. 2, 3 and 4, the inlet hose (17) is on the front, just as the exhaust fan (30) is also on the front of the container (12).

Obviously, many modifications and variations of the present invention are possible in light of the above teachings. It is therefore to be understood that, within the scope of the appended claims, the invention may be practised otherwise than as specifically described.

I claim:

1. A wet air cleaning apparatus comprising:

a sealed container adapted to hold a liquid;

means for filling said container with liquid to a first predetermined level;

a compartment disposed within said container, said compartment being sealed at the top and sides and being open at the bottom thereof, the bottom of said compartment being spaced upwardly from the bottom of said container for allowing liquid in the container to seal the air into the top of said compartment, the bottom of said compartment being disposed below said first predetermined level of liquid;

an inlet means operably attached to an upper portion of said compartment for permitting outside air to enter said compartment;

container air outlet means on an upper portion of said container for permitting air to exit from said container;

exhaust fan means operably attached to said air outlet for pulling air out of said container;

compartment air outlet means operably attached to said compartment for permitting air to exit from said compartment into said container, said compartment air outlet means being positioned at a second predetermined level of said liquid level;

pump means having an outlet for pumping the liquid within said container;

a first spray nozzle means disposed at an upper position in said compartment for spraying liquid onto the air entering said container whereby solids floating in such air will become wet and heavy thereby causing such wet and heavy solids to fall into the liquid at the bottom of said compartment;

means for fluidly connecting the outlet of said pump means to said first spray nozzle means to supply liquid under pressure thereto;

a second spray nozzle means disposed above said air outlet means for spraying a liquid onto the air exiting said container whereby solid particles in the air will become wet and heavy to cause them to fall into the liquid in said container;

means for fluidly connecting the outlet of the pump means to said second spray nozzle to supply liquid under pressure thereto; and air filter means disposed adjacent to said air outlet means for filtering solid particles out of air exiting said container through said air outlet due to the action of the exhaust fan means.

2. The wet air cleaning apparatus of claim 1 including venturi scrubber means including a cone-shaped member extending into, but spaced from said compartment air outlet means.

3. The wet air cleaning apparatus of claim 2 wherein the size of the compartment air outlet is smaller in cross sectional area than the effective size of the air inlet means whereby the air pressure in said compartment will be greater than the air pressure in said container.

4. The wet air cleaning apparatus of claim 1 including a third spray nozzle means disposed in said container generally below said compartment and directed to a space below said compartment for moving the liquid containing solid particles in said space to be circulated into other parts of said container, and means for fluidly connecting said pump means outlet to said third spray nozzle means.

5. The wet air cleaning apparatus of claim 1 wherein said air filter means includes a pre-filter connected in series with a high efficiency particulate air filter to separate any remaining solids from the air exiting said container.

6. The wet air cleaning apparatus of claim 5 including a baffle disposed fluidly upstream from said air filter means.

7. The wet air cleaning apparatus of claim 3 including gauge means for measuring the air pressure differential between the container and the compartment.

8. The wet air cleaning apparatus of claim 3 including means attached to said container for adjusting the position of said cone with respect to said compartment air outlet.

9. The wet air cleaning apparatus of claim 8 wherein said second spray nozzle means is disposed upstream of said compartment air outlet means.

10. The wet air cleaning apparatus of claim 8 including sight glass means connected to said container for determining the level of liquid within said container.

* * * * *